United States Patent
Bao et al.

(10) Patent No.: US 9,804,782 B1
(45) Date of Patent: Oct. 31, 2017

(54) FULLY SCALABLE COMMAND EXECUTION UNIT

(71) Applicant: SK hynix memory solutions inc., San Jose, CA (US)

(72) Inventors: Shengkun Bao, San Jose, CA (US); Ananthanarayanan Nagarajan, Palo Alto, CA (US); Kin Ming Chan, Fremont, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 47 days.

(21) Appl. No.: 14/880,013

(22) Filed: Oct. 9, 2015

Related U.S. Application Data (60) Provisional application No. 62/065,443, filed on Oct. 17, 2014.

(51) Int. Cl.
    *G06F 3/06* (2006.01)

(52) U.S. Cl.
    CPC ............ *G06F 3/061* (2013.01); *G06F 3/0659* (2013.01); *G06F 3/0679* (2013.01); *G06F 2206/1014* (2013.01)

(58) Field of Classification Search
    CPC ....... G06F 3/061; G06F 3/0679; G06F 3/0659
    USPC ................................................ 711/103; 710/5
    See application file for complete search history.

(56) References Cited

U.S. PATENT DOCUMENTS

2014/0298061 A1* 10/2014 Volvovski ............ G06F 3/0625 713/323

* cited by examiner

*Primary Examiner* — Jasmine Song
(74) *Attorney, Agent, or Firm* — IP & T Group LLP (57) ABSTRACT

A setting associated with a number of command execution units to enable is received at a host controller. The host controller is used to configure a plurality of command execution units so that the number of command execution units specified by the setting are enabled. The enabled command execution units are used to process one or more commands associated with storage.

20 Claims, 5 Drawing Sheets

FULLY SCALABLE COMMAND EXECUTION UNIT

CROSS REFERENCE TO OTHER APPLICATIONS

This application claims priority to U.S. Provisional Patent Application No. 62/065,443 entitled FULLY SCALABLE COMMAND EXECUTION UNIT filed Oct. 17, 2014 which is incorporated herein by reference for all purposes.

BACKGROUND OF THE INVENTION

Host controllers sit between a host (e.g., accessible via a PCIe or NVMe interface) and storage media or drives (e.g., solid state storage, such as NAND storage) on the other side. Host controllers process instructions from the host directed to the storage, such as read and write instructions. Sometimes, the desire for high performance conflicts with the desire for a host controller that is not power hungry. Host controllers with new features which address these conflicting design goals would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
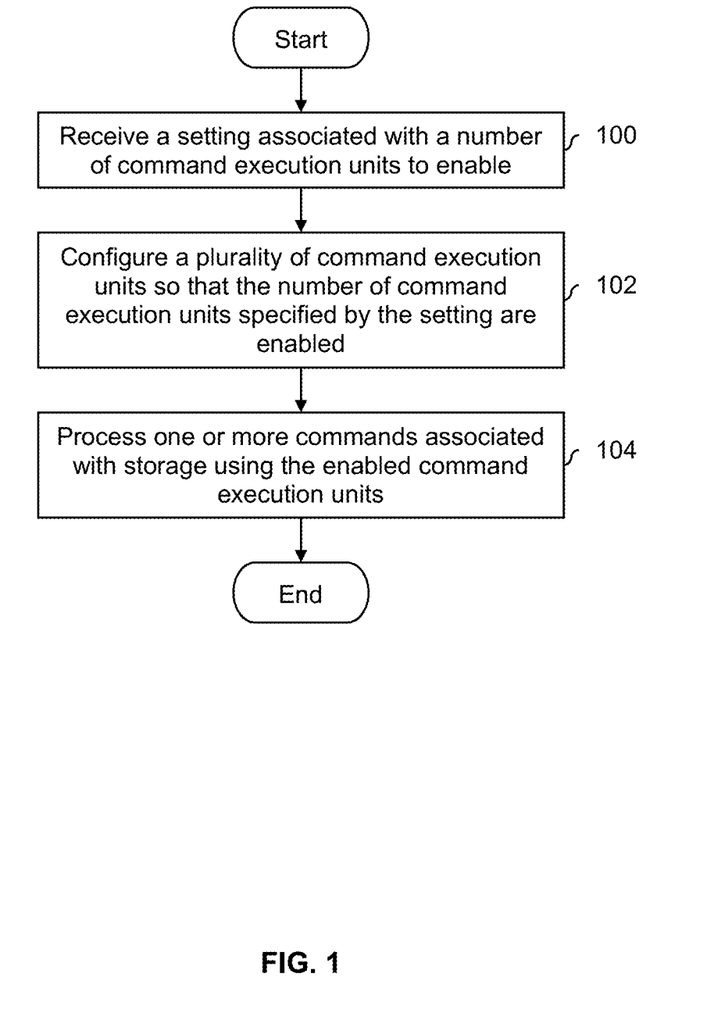
FIG. 1 is a flowchart illustrating an embodiment of a process for enabling an adjustable number of command execution units in a host controller.

FIG. 1 is a flowchart illustrating an embodiment of a process for enabling an adjustable number of command execution units in a host controller. In some embodiments, the process is performed by a host controller. Such a host controller may sit between a host and storage media (e.g., solid state storage, such as NAND). In some embodiments, the process of FIG. 1 enables a host controller to save power by reducing the number of enabled or "on" command execution units.

At 100, a setting associated with a number of command execution units to enable is received. As will be described in more detail below, command execution units process commands from a host. For example, a command may be to read data from storage or write data to storage. In some embodiments, command execution units process host instructions independently from one another, such that a particular command execution unit does not need to know or care if other command execution units are enabled. In some embodiments, a command execution unit checks to ensure that it is safe to perform a particular host command (e.g., stored data will not be corrupted, nor will returned data be an incorrect value) and then queues up or otherwise sends the instruction off for execution.

In some embodiments, the setting received at step 100 explicitly or quantitatively specifies the number of command execution units to enable (e.g., number_of_enabled_CEUs=6). In some embodiments, a host controller starts out with all command execution units enabled and the number is permitted to change over the lifetime of the system. Alternatively, the setting received at step 100 may be a qualitative value which does not explicitly or quantitatively say how many command execution units to enable.

In some embodiments, the setting received at step 100 is generated at the behest of some entity, such as firmware or some entity above the firmware. Alternatively, a host controller may automatically detect when parts of the system are in certain states or certain events have occurred and may automatically change the setting accordingly. Some examples of this are described in more detail below.

At 102, a plurality of command execution units is configured so that the number of command execution units specified by the setting are enabled. In various contexts and/or applications, enabling may be referred to or comprise (e.g., in addition to or as an alternative to the term "enabled") as powering/turning on, activating, enabling or turning on a clock signal, etc. Thus, an enabled command execution unit may sometimes be referred to herein as an active command execution unit, an "on" command execution unit, a powered-on command execution unit, a clock-enabled command execution unit, etc.

In some embodiments, command execution units are implemented in hardware, such as a semiconductor device (e.g., an application-specific integrated circuit (ASIC) or a field-programmable gate array (FPGA)). In some such embodiments, enabling includes turning on a (e.g., gated) clock so that a particular command execution units has an enabled clock signal (e.g., that goes up and down as opposed to staying low or staying high). In semiconductor devices, when there is no clock signal, the only power being consumed is due to leakage current, which is minimal. There is (for example) no power consumed by the digital logic in the command execution units due to switching (e.g., a signal or line from 0 to 1, or from 1 to 0) when there is no clock signal.

As described above, the setting received at step 100 may correspond to a qualitative value (e.g., as opposed to quantitative value). For example, there may be 3 settings of: high power (performance), medium power (performance), or low power (performance). Each of the exemplary qualitative settings may then correspond to a certain number of command execution units being enabled (e.g., 8 out of 8, 5 out of 8, or 2 out of 8, respectively) and the command execution units are enabled accordingly.

At 104, one or more commands associated with storage are processed using the enabled command execution units. For example, those command execution units which are enabled may service a plurality of command buffers into which a host puts host commands (e.g., read or write commands). Each enabled command execution unit may select one of the command buffers (e.g., the one with the highest priority host command, or the oldest host command), check that the host command can be performed (e.g., it will not compromise the integrity of the stored data or any data returned to the host due to a pending command which has not yet completed), and (if the check passes), send the host command off for execution. The enabled command execution unit then selects another command buffer and repeats the process. In some embodiments, some other logic (e.g., other than a command execution unit) updates some table or log when a host command has completed.

One benefit to the process of FIG. 1 is that the amount of power consumed by a host controller may be reduced if desired. An enabled command execution unit (e.g., implemented as a semiconductor) will consume power when its internal logic switches (e.g., from 0 to 1, or from 1 to 0). A disabled command execution unit will not be switching (e.g., internally) and therefore the only power consumption will be due to leakage current (which is negligible).

Another advantage to the process of FIG. 1 is that (in some systems, at least) some neighboring components do not need to be changed or modified in order to support this feature. For example, the number of command buffers exposed to the host does not change, even when the number of enabled command execution units changes. This may be desirable because it makes the enabling/disabling of command execution units transparent to the host, and it does not require any changes to the host to support this feature.

Similarly, in some embodiments, no changes to the command execution units is required to support this feature. This may be because in some systems, each command execution unit operates independently of the other command execution units, so a particular command execution unit will not care if other command execution units are also enabled and servicing the same set of command buffers (or not).

The process of FIG. 1 may be repeated as desired in order to achieve a power consumption goal. For example, the exact amount of power saved may vary depending upon the host traffic (e.g., very little host traffic versus a large amount of host traffic). As such, in some embodiments, the process of FIG. 1 may be performed with one command execution unit disabled and the amount of power consumed may be measured. If the power consumption goal has still not been achieved, then the process of FIG. 1 may be repeated again with another command execution unit disabled. This may be repeated as desired.

The following figure shows an example of a system which may perform the process of FIG. 1. Naturally, the figure described below is merely exemplary and is not intended to be limiting.

Figure 2:
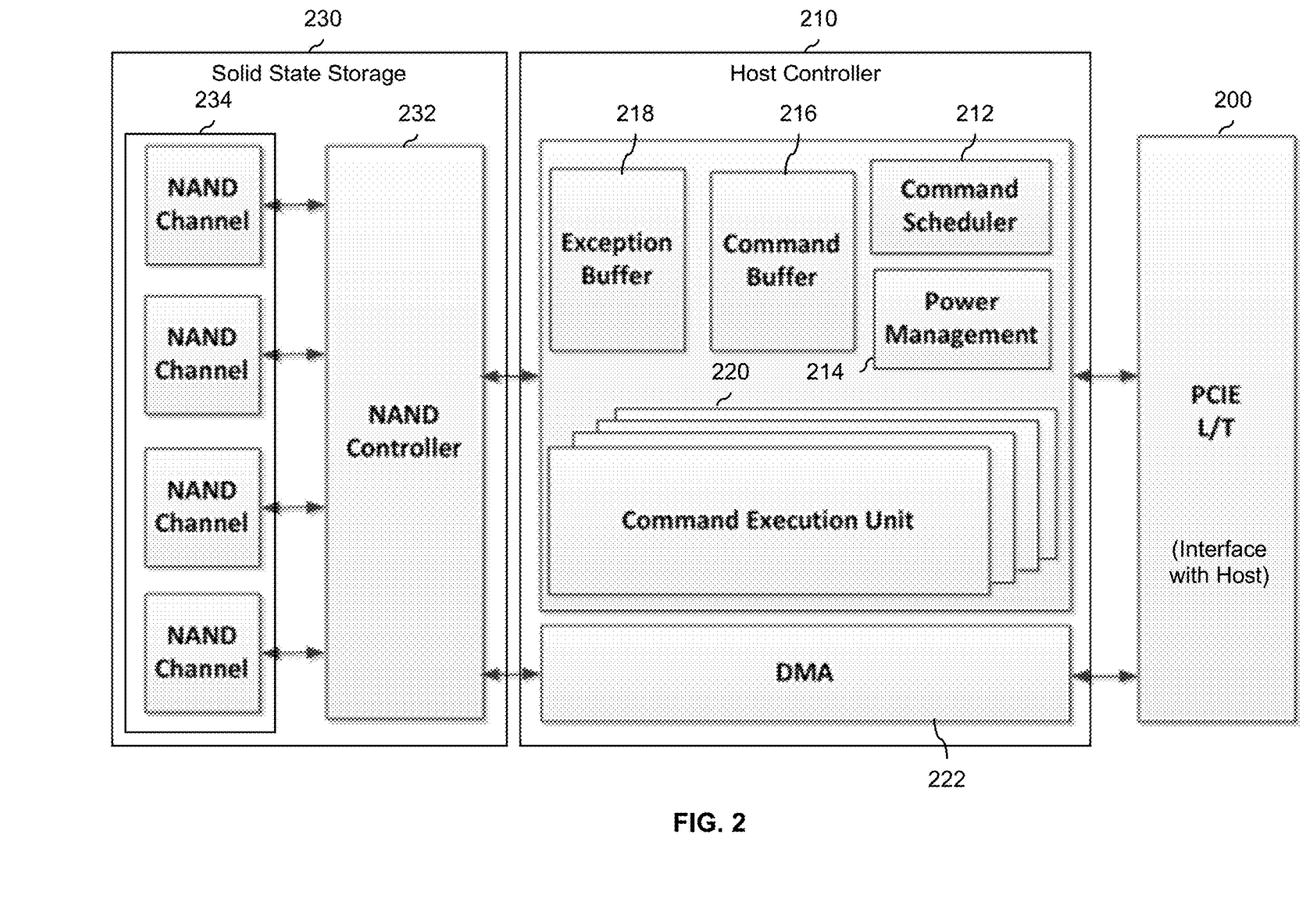
FIG. 2 is a diagram illustrating an embodiment of a system in which an adjustable number of command execution units are enabled.

FIG. 2 is a diagram illustrating an embodiment of a system in which an adjustable number of command execution units are enabled. In the example shown, host controller 210 sits between PCIe (200), which is the interface via which the host controller and the host communicate, and solid state storage 230. Solid state storage 230 includes NAND controller 232 and a plurality of NAND channels 234 (e.g., where each NAND channel goes to a different NAND chip or package). For example, host commands may include read command and write commands directed to solid state storage 230.

In this example, host controller 210 includes 4 command execution units (220). At any given time, any number of the command execution units may be enabled. In one example, the systems initially has all 4 command execution units enabled. Subsequently, the number of enabled command execution units may be reduced in order to save power.

In some embodiments, firmware (not shown) generates a setting which controls the number of command execution units (220) which are enabled. In some embodiments, command execution units 220 are implemented in hardware (e.g., an ASIC or FPGA) and each command execution unit has a separate or independent gated clock. By turning off the gated clock fed into a particular command execution unit, that command execution unit may be disabled or otherwise turned off. Using gated clocks may be easier and/or take up less space on a semiconductor than (for example) having independent power supplies and turning off one or more of the independent power supplies to certain command execution units.

In some embodiments, the power management block (214) automatically checks for certain conditions or states and adjusted the number of enabled command execution units accordingly. In some embodiments, power management block tracks or otherwise detects the number of active or "on" NAND channels (234). If any of the NAND channels (234) are inactive or turned off, the number of enabled command execution units is decreased. This detection and adjustment is performed automatically, for example without any direction or intervention from the host, firmware, etc.

In another example, power management 214 tracks the number of PCIe lanes in PCIe 200. If one of the PCIe lanes goes down, then power management 214 may automatically decrease the number of enabled command execution units.

In another example, power management 214 tracks the link speed of PCIe interface (200). For example, PCIe 3.0 supports up to 8 GT/s. Thus, if the link speed is at 2.5 GT/s or 5 GT/s, then the link is not at full speed. In some embodiments, power management 214 reduces the number of enabled command execution units (e.g., by generating a setting corresponding a reduced number of enabled command execution units) when it detects that the link is not at full speed and/or the link speed has decreased.

Command buffer 216 is used to store all the commands from the PCIe host and is shared by all (enabled) command execution units (e.g., since any (enabled) command execution unit can process any host command). The buffer allocation is dynamic and changeable on the fly (e.g., to adapt as the number of command execution units fluctuates over the lifetime of the host controller). In one example, there is only a single enabled command execution unit and that command execution unit owns or otherwise accesses the entire buffer.

Command scheduler 212 is responsible for dispatching commands to those command execution units (234) which are enabled and coordinates the use of shared command buffer (216). In some embodiments, the command scheduler is not necessarily the block that turns on/off the command execution units, but it may keep track of which command execution units are enabled. For example, the number of command execution units to enable or turn on may be selected by the host controller (e.g., in response to an end user specifying a power budget and based on each command execution unit's power numbers, the host controller will enable the appropriate number of command execution units). In this example, although the command scheduler may not necessarily turn on/off the command execution units, the command scheduler will track the number of enabled command execution units so that it is aware of the available resources (i.e., the number of enabled command execution units) in order to allocate traffic.

Exception buffer 218 is responsible for gathering exceptions or errors that cannot be handled by the command execution units. In this example, it reports those exceptions to an embedded processor (not shown) and lets the firmware handle them. In some embodiments, having a separate or dedicated exception buffer is desirable because it reduces the design complexity, area, and power consumption of the command execution unit (e.g., because the command execution unit only has to report exceptions but not handle them, which tends to be complicated).

It is noted that the PCIe interface shown in this figure and in other figures is merely exemplary and is not intended to be limiting. Any type of interface may be used.

Figure 3:
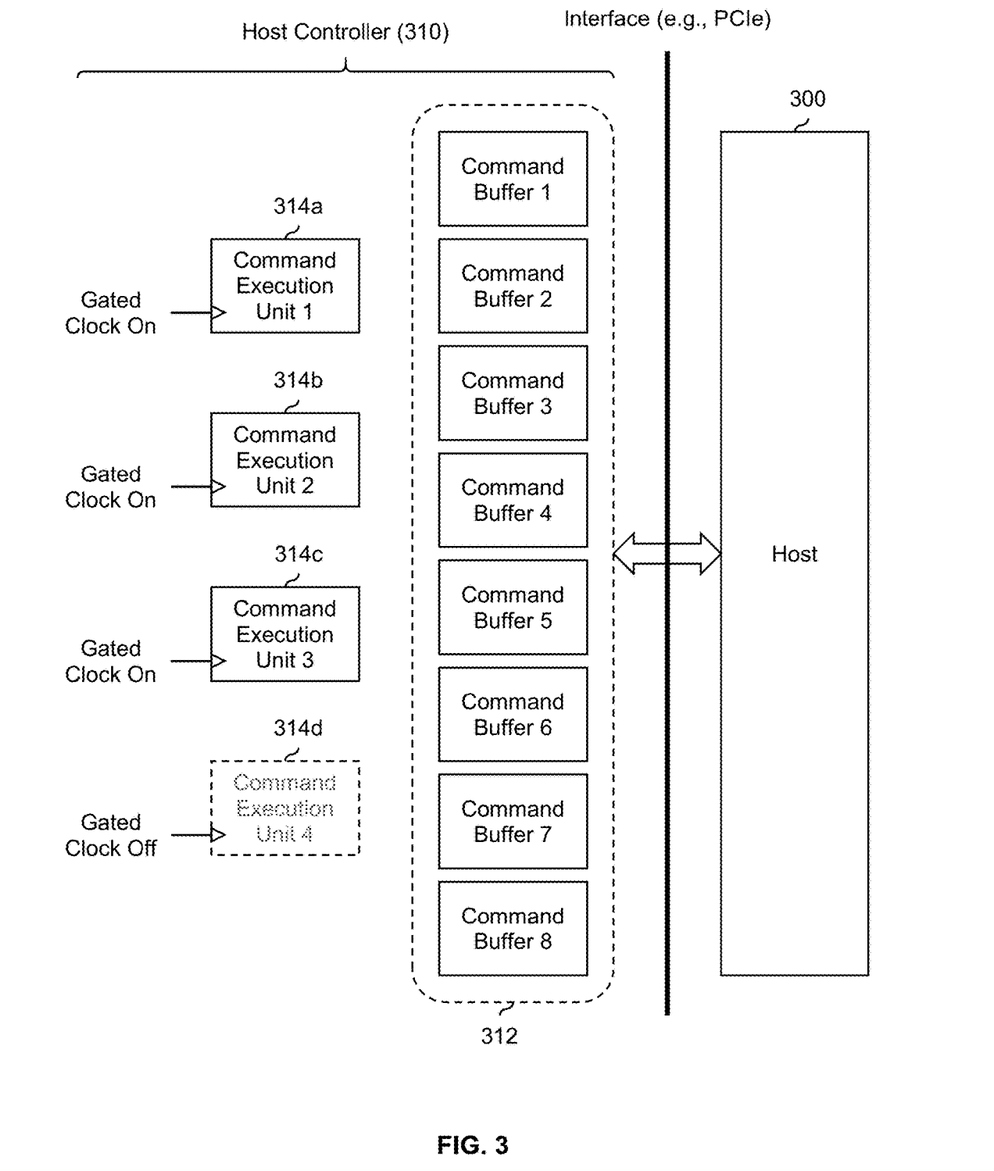
FIG. 3 is a diagram illustrating an embodiment of an adjustable number of command execution units which service a fixed number of command buffers.

The following figure shows an example where those command execution units which are enabled service a fixed number of command buffers.

FIG. 3 is a diagram illustrating an embodiment of an adjustable number of command execution units which service a fixed number of command buffers. In the example shown, host controller 310 includes 4 command execution units (314a-314d) and 8 command buffers (312). The command execution units in this example are enabled using gated clocks. In the state shown, each of the first 3 command execution units (314a-314c) is enabled by not gating the clock input to that particular command execution unit such that the clock fed into those command execution units are on. The fourth command execution unit (314d) is disabled by gating the clock so that the clock is off (e.g., the clock signal, if examined, would be a steady high value or a steady low value).

The three enabled command execution units (314a-314c) process the host commands in command buffers 312. For example, each command execution unit may operate independently of the other commands units, servicing the next highest priority host command or command buffer and/or servicing the longest waiting host command or command buffer. The number of command buffers (in this example, 8) exposed to host 300 remains the same (e.g., even as the number of enabled command execution units fluctuates) and thus host 300 can put host commands into any of the command buffers even if or while command execution units are enabled or disabled. In some embodiments, command buffer 216 in FIG. 2 is implemented as shown in this example (e.g., with a fixed number of command buffers).

In some embodiments, power is still supplied to command execution unit 314d even though it is disabled. In some applications (e.g., semiconductors) it may be easier and/or more desirable to disable selected blocks using gated clocks as opposed to turning off the power to that block.

Figure 4:
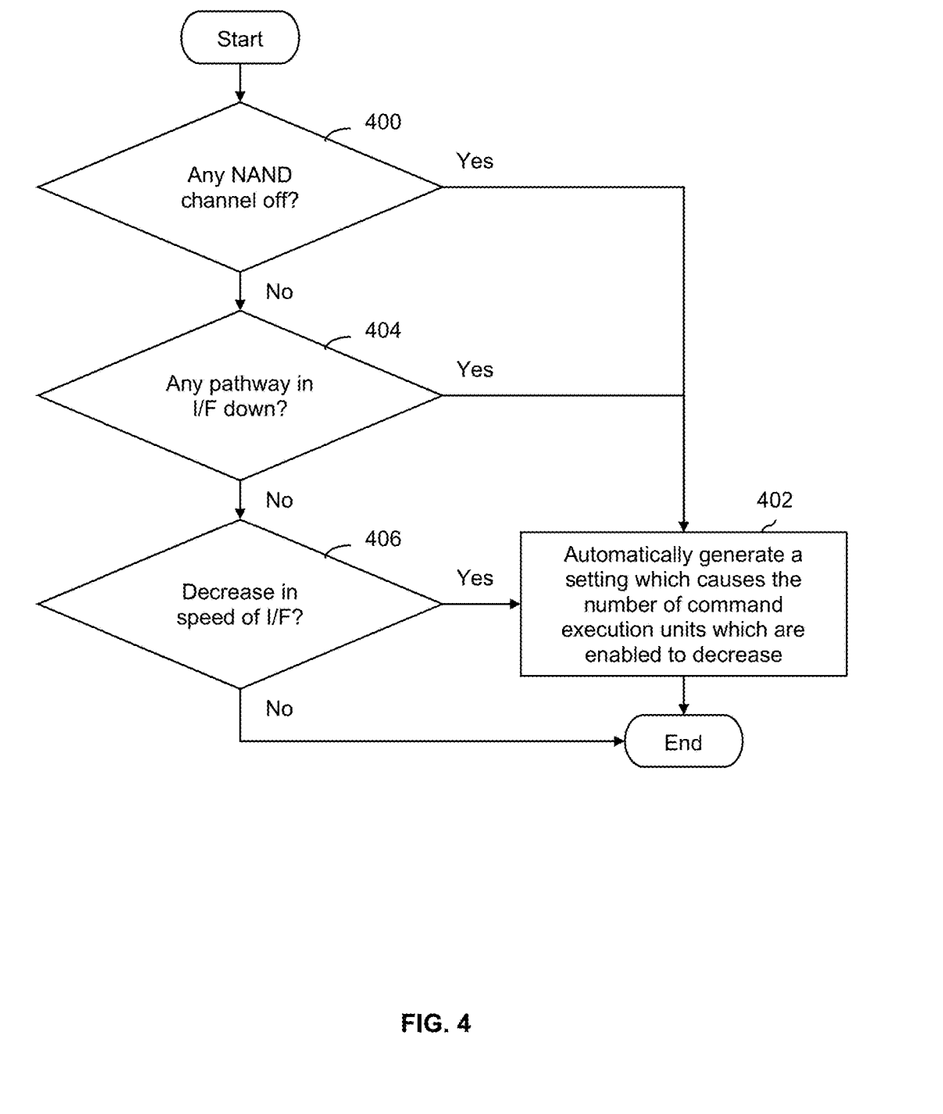
FIG. 4 is a flowchart illustrating an embodiment of a process to automatically adjust a setting associated with a number of enabled command execution units.

As described above, in some embodiments, the number of enabled command execution units is adjusted automatically. The following figure shows an example of this.

FIG. 4 is a flowchart illustrating an embodiment of a process to automatically adjust a setting associated with a number of enabled command execution units. In some embodiments, the process of FIG. 4 is performed in combination with FIG. 1. In some embodiments, the process of FIG. 4 is performed by power management block 214 in FIG. 2.

At 400, it is determined if any NAND channels are off. If so, a setting is automatically generated which causes the number of command execution units which are enabled to decrease at 402. For example, if any of NAND channels 234 in FIG. 2 is down or turned off, a setting may be adjusted so that fewer command execution units are enabled.

If none of the NAND channels are off at 400, it is determined at 404 if any pathway in the interface is down. The interface in this check is the interface to the host, for example, PCIe 200 in FIG. 2. If so, a setting is automatically generated which causes the number of command execution units which are enabled to decrease at 402.

If none of the pathways are down at 404, it is determined at 406 if there is a decrease in the speed of an interface. For example, even though none of the pathways in an interface to a host are down, the speed of that interface may have decreased. If so, a setting is automatically generated which causes the number of command execution units which are enabled to decrease at 402.

Although not explicitly shown in FIG. 4, if none of the checks at 400, 404, or 406 pass, the number of enabled command execution units remains the same. Similarly, the tests and actions which are the opposite of those shown in FIG. 4 may be performed (e.g., if any NAND channel turns on (e.g., after being off), if any pathway in the interface with a host turns on (e.g., after being off), and/or if the speed of an interface increases, then a setting may be automatically generated which causes the number of command execution units which are enabled to increase).

For convenience, the tests associated with steps 400, 404, and 406 are shown in a single flowchart. Naturally, each of the tests may be performed individually, for example without testing for or otherwise dependent upon any of the other tests shown.

Figure 5:
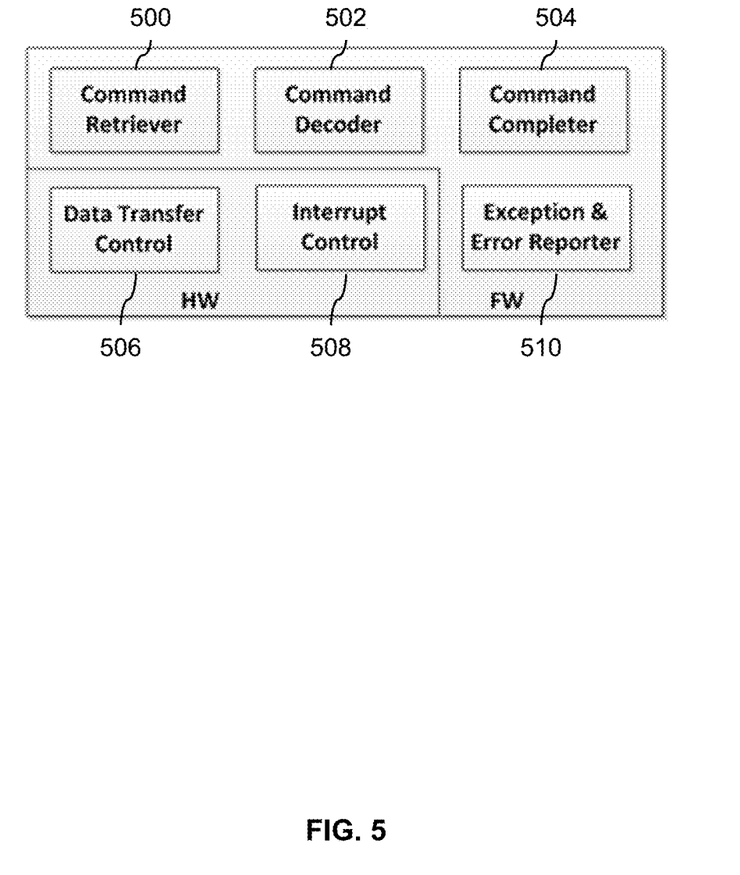
FIG. 5 is a diagram illustrating an embodiment of the hardware and firmware components in a command execution unit.

The following figure illustrates an embodiment of command execution unit which may be enabled or disabled as desired. In some embodiments, the command execution units in FIG. 2 and/or FIG. 3 are implemented as shown.

FIG. 5 is a diagram illustrating an embodiment of the hardware and firmware components in a command execution unit. The implementation shown here is merely exemplary and is not intended to be limiting. Naturally, a component which is shown in this example as being implemented in hardware may be implemented in some other embodiment using firmware and vice versa.

In the context of processing host commands, the command retriever (500) goes first and retrieves commands from a command buffer (not shown) and acknowledges the command scheduler. Then, the command decoder (502) decodes the host command, which includes (for example) calculate the number of PCIe and NAND commands, determining the type of command (e.g., read, write, etc.), the read or write address(es) involved, the location of any data buffers (e.g., where the data will be written to for a read command, or where the write data is stored for a write command). The data transfer control block (506) then issues the appropriate PCIe and NAND commands to the DMA and track their status. Finally, the command completer (504) send out host completion packets and the interrupt control block (508) interrupts the PCIe host when command(s) are completed.

The exception and error reporter block (510) sends exception and error messages to firmware (not shown) since the handling can take some time and there may be many rules associated with exception and error handling. As such, this makes firmware better suited to the actual handling or resolution of the error or exception, as opposed to the command execution block.

In this example, command retriever 500, command decoder 502, command completer 504, and exception and error reporter 510 are implemented in firmware. Generally speaking, in this example, these blocks perform more protocol-specific operations where the exact operation may vary from protocol to protocol. As such, it may be desirable to implement those blocks in firmware so that they can be changed and/or updated if the protocol changes, for example because of a version upgrade or a new protocol is supported. More specifically, the formatting of the host commands and/or handshaking with a host interface may be different and so it may be desirable for the command retriever (500), command decoder (502), and command completer (504) to be soft-coded. Similarly, some protocols or systems may require errors or exceptions to be reported in a different manner, or may consider different things to be exceptions errors or neither (e.g., what is an error is one system is an exception in another, or what is an exception in one system is neither an error nor an exception in another).

Data transfer control 506 and interrupt control 508 are implemented in hardware in this example. Those operations are fairly protocol-independent and do not vary much, if at all, from protocol to protocol. As such, it is safe to implement them in hardware as hard-coded operations because they are unlikely to change (e.g., even if there is a version upgrade or a new protocol is supported). It would not be desirable, for example, to have to "re-spin" a semiconductor chip to redo hardware-implemented operations or blocks because the associated costs are very high.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a storage; and
a host controller configured to:
receive a setting specifying a number of command execution units to enable, wherein the setting is generated in accordance with events of the system, and the events include on/off of channels of the storage, on/off of pathways in interface to a host, changes of speed of the interface, or combination thereof;
configure a plurality of command execution units so that the number of command execution units specified by the setting are enabled; and
process one or more commands associated with the storage using the enabled command execution units.

2. The system recited in claim 1, wherein the system includes a semiconductor device, including one or more of the following: an application-specific integrated circuit (ASIC) or a field-programmable gate array (FPGA).

3. The system recited in claim 1, wherein the host controller includes a plurality of command buffers which is serviced by the enabled command execution units, wherein the number of command buffers is fixed.

4. The system recited in claim 1, wherein the host controller configures the plurality of command execution units, including by enabling a gated clock to those command execution which are to be enabled.

5. The system recited in claim 1, wherein the host controller includes a power management block which is configured to:
determine if any NAND channel is off; and
in the event it is determined that at least one NAND channel is off, automatically generate a setting which causes the number of command execution units which are enabled to decrease.

6. The system recited in claim 1, wherein the host controller includes a power management block which is configured to:
determine if the pathway in the interface with the host is down; and
in the event it is determined that at least one pathway in the interface with the host is down, automatically generate a setting which causes the number of command execution units which are enabled to decrease.

7. The system recited in claim 1, wherein the host controller includes a power management block which is configured to:
determine if there is a decrease in the speed of the interface with the host; and
in the event it is determined that there is a decrease in the speed of the interface with the host, automatically generate a setting which causes the number of command execution units which are enabled to decrease.

8. The system recited in claim 1, wherein each command execution unit in the plurality of command execution units includes:
a command retriever, a command decoder, a command completer, and an exception and error reporter which are implemented in firmware; and
a data transfer control block and an interrupt control block which are implemented in hardware.

9. A method, comprising:
receiving, at a host controller, a setting specifying a number of command execution units to enable, wherein the setting is generated in accordance with events of the system, and the events include on/off of channels of the storage, on/off of pathways in interface to a host, changes of speed of the interface, or combination thereof;
using the host controller to configure a plurality of command execution units so that the number of command execution units specified by the setting are enabled; and
using the enabled command execution units to process one or more commands associated with storage.

10. The method recited in claim 9, wherein the method is performed by a semiconductor device, including one or more of the following: an application-specific integrated circuit (ASIC) or a field-programmable gate array (FPGA).

11. The method recited in claim 9, wherein the host controller includes a plurality of command buffers which is serviced by the enabled command execution units, wherein the number of command buffers is fixed.

12. The method recited in claim 9, wherein configuring the plurality of command execution units includes enabling a gated clock to those command execution which are to be enabled.

13. The method recited in claim 9 further comprising:
determining if any NAND channel is off; and
in the event it is determined that at least one NAND channel is off, automatically generating a setting which causes the number of command execution units which are enabled to decrease.

14. The method recited in claim 9 further comprising:
determining if the pathway in the interface with the host is down; and
in the event it is determined that at least one pathway in the interface with the host is down, automatically generating a setting which causes the number of command execution units which are enabled to decrease.

15. The method recited in claim 9 further comprising:
determining if there is a decrease in a speed of the interface with the host; and
in the event it is determined that there is a decrease in the speed of the interface with the host, automatically generating a setting which causes the number of command execution units which are enabled to decrease.

16. The method recited in claim 9, wherein each command execution unit in the plurality of command execution units includes:
a command retriever, a command decoder, a command completer, and an exception and error reporter which are implemented in firmware; and
a data transfer control block and an interrupt control block which are implemented in hardware.

17. A computer program product, the computer program product being embodied in a non-transitory computer readable storage medium and comprising computer instructions for:
receiving, at a host controller, a setting specifying a number of command execution units to enable, wherein the setting is generated in accordance with events of the system, and the events include on/off of channels of the storage, on/off of pathways in interface to a host, changes of speed of the interface, or combination thereof;
using the host controller to configure a plurality of command execution units so that the number of command execution units specified by the setting are enabled; and
using the enabled command execution units to process one or more commands associated with storage.

18. The computer program product recited in claim 17 further comprising computer instructions for:
determining if any NAND channel is off; and
in the event it is determined that at least one NAND channel is off, automatically generating a setting which causes the number of command execution units which are enabled to decrease.

19. The computer program product recited in claim 17 further comprising computer instructions for:
determining if the pathway in the interface with the host is down; and
in the event it is determined that at least one pathway in the interface with the host is down, automatically generating a setting which causes the number of command execution units which are enabled to decrease.

20. The computer program product recited in claim 17 further comprising computer instructions for:
determining if there is a decrease in a speed of the interface with the host; and
in the event it is determined that there is a decrease in the speed of the interface with the host, automatically generating a setting which causes the number of command execution units which are enabled to decrease.

* * * * *